United States Patent [19]

Bronnec

[11] 4,227,447
[45] Oct. 14, 1980

[54] MACHINE FOR MANUFACTURING PANCAKES OR SIMILAR PRODUCTS

[75] Inventor: Jean A. L. Bronnec, Brest, France

[73] Assignee: Etablissements Generaux de Mecanique de l'Ouest EGMO (Societe Anonyme), Brest, France

[21] Appl. No.: 849,566

[22] Filed: Nov. 8, 1977

[30] Foreign Application Priority Data

Nov. 10, 1976 [FR] France ............................ 76 33927

[51] Int. Cl.³ .......................................... A47J 37/10
[52] U.S. Cl. ................................................... 99/423
[58] Field of Search ...................... 99/423, 424, 443 R

[56] References Cited

U.S. PATENT DOCUMENTS

| | | | |
|---|---|---|---|
| 3,489,106 | 1/1970 | Lostanlen | 99/423 X |
| 3,543,694 | 12/1970 | Tanguy et al. | 99/423 X |
| 3,630,140 | 12/1971 | Marrie | 99/423 |
| 3,814,006 | 6/1974 | Giraud | 99/423 |
| 3,937,137 | 2/1971 | Marrie | 99/423 |
| 3,978,781 | 9/1976 | Tanguy | 99/423 |

Primary Examiner—Philip R. Coe
Assistant Examiner—Arthur O. Henderson
Attorney, Agent, or Firm—Edwin E. Greigg

[57] ABSTRACT

Products such as pancakes, obtained by baking or heating a paste spread thinly in a given configuration are made on a machine comprising a smooth and continuous baking surface, which can be flat or evolute, actuated in relative movement with respect to a spreader constituted by a cylinder with a smooth surface dipping into a paste tank at a substantially constant level and arranged to transport and to transfer the paste onto the baking surface at the level of two close generators situated respectively on the baking surface and on the spreader and called transfer generators. A so-called "obturator" is arranged in the immediate vicinity of the generator of the spreader situated at the level of the surface of the paste on the emergence side, and called extraction generator, eliminates the contact necessary for the drawing of the paste by the spreader at certain points of the generator. The obturator is arranged so that for each of its relative positions, these points vary along the extraction generator and it is driven in continuous or to and fro movement.

7 Claims, 7 Drawing Figures

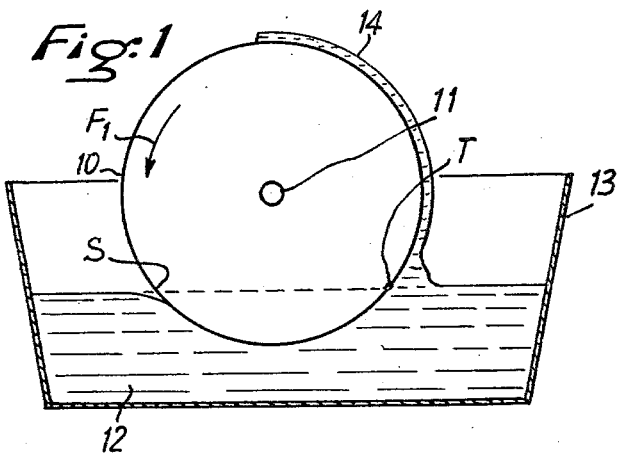
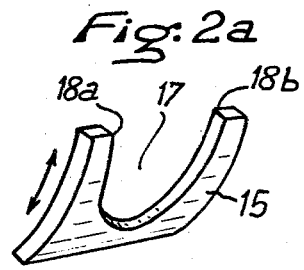
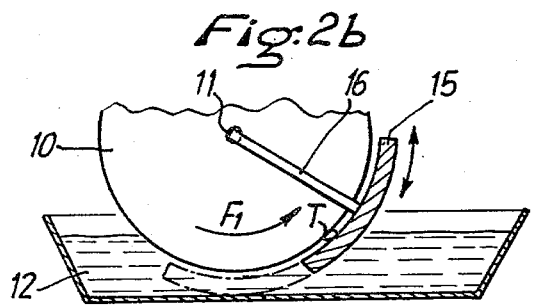
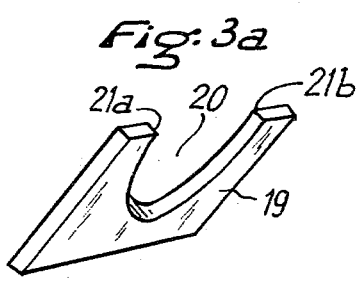
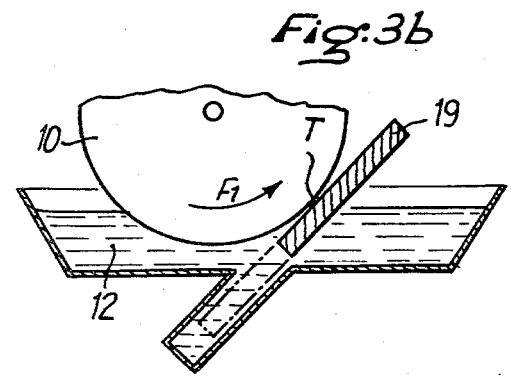
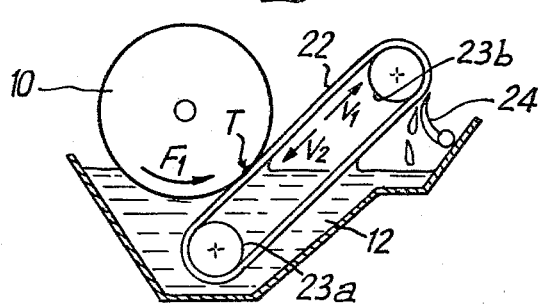

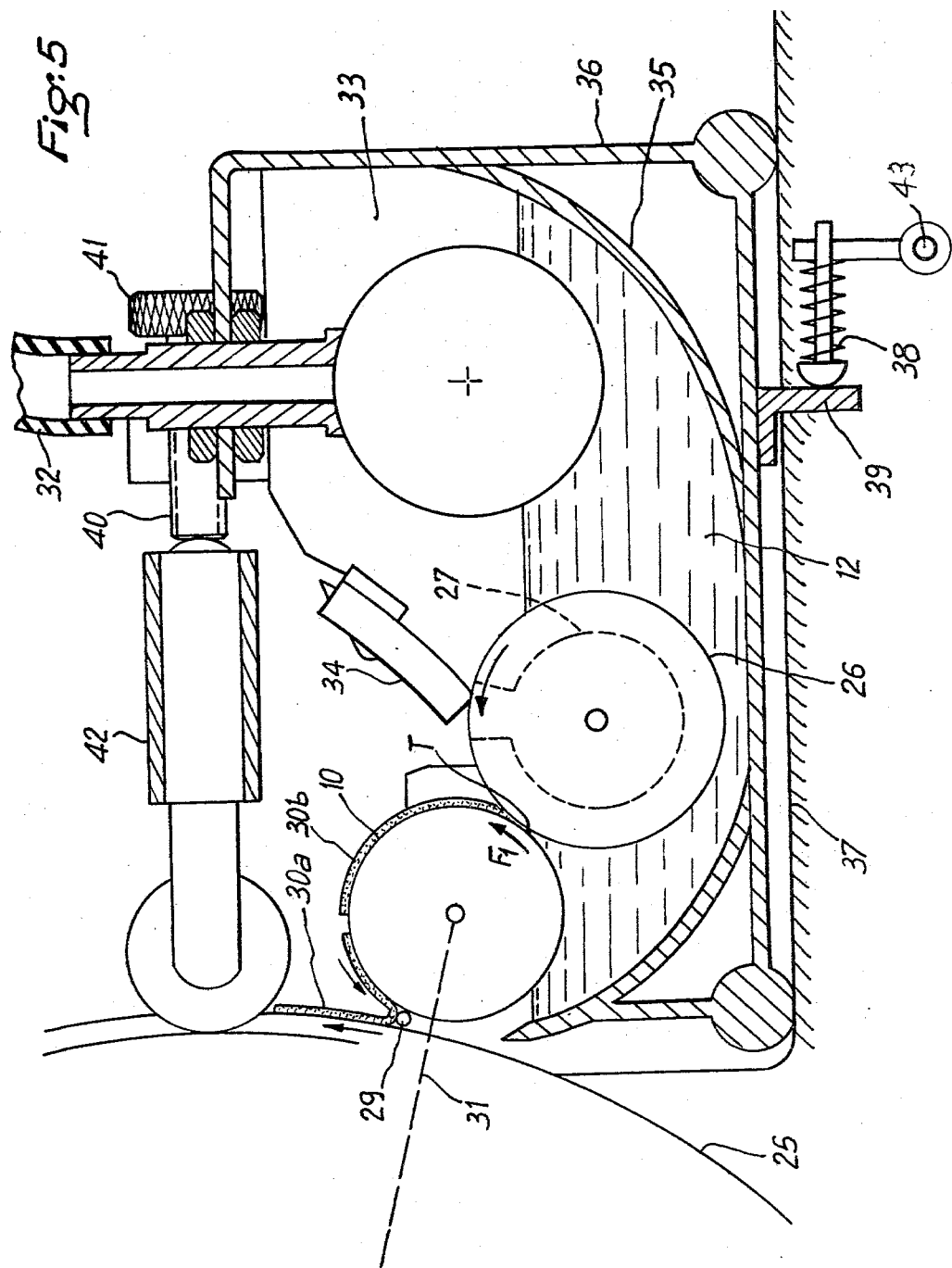

MACHINE FOR MANUFACTURING PANCAKES OR SIMILAR PRODUCTS

BACKGROUND OF THE INVENTION

1. Field of the Invention

The invention relates to machines for making pancakes or any other edible or non-edible products obtained by baking or heating a paste spread in small thickness over a given configuration.

2. Description of the Prior Art

For the industrial manufacture of such products, of tasting pancakes for example, numerous machines have been conceived. All include a heating surface and a spreading device designed to transfer the paste from a container to the heating surface.

The heating or baking surface is theoretically of any type but generally it is flat or developable and it is in relative movement with respect to the spreader. Mostly it is continuous and constituted for example by a rotating plate, an endless heating band, cylinder or a frustum of a cone.

This baking surface is very generally heated either by a gas ramp, or electrically by incorporated resistors. On completion of baking, the product is detached from the heating surface by a scraper.

This heating surface is sometimes called a first baking device with the product requires baking on both sides. In this case the scraper causes the product to fall onto a second heating surface generally flat (rotating plate, alternating table, or an endless band) or again cylindrical.

The spreading device is very often that already used previously in drilling machines, that is to say a cylinder or an endless band dipping into a paste tank with substantially constant level. The generators of the spreader device are parallel to the generator of the baking surface which is closest to it. The spacing between said generator and that, closest, of the spreader device is substantially equal to the thickness of the product at the commencement of baking. The tangential speed of the two devices, baking surface and spreader, may be, in the vicinity of the transfer generators, in the same direction or in opposite direction.

It is rare for the desired shape of the finished product to be that of a continuous band of constant width and the means used to give the product a pre-determined shape, round, eliptical, square, in parallel strips, etc., are various.

Sometimes this shape in engraved in relief in a plurality of patterns on the heating surface, the reliefs which are successively presented before the smooth coater alone receiving a layer of paste, the "hollow" parts being spared.

The reverse is also possible and in certain machines, the heating surface is smooth and continuous and the coater includes reliefs so as to limit the pasting to the latter, but it is then necessary for the level of the paste in the tank to be adjusted precisely and very substantially constant.

In order to enable modification of the shape of the finished products by simple manipulation, it has been conceived to provide a smooth surface both for the heating surface and for the coater and to associate with a machine a "shaper" device such that at least before the transfer the pasting of the coater is limited in the corresponding shape on the heating surface to that desired for the finished product, that is to say whose development is deduced from the shape of the finished product by an orthogonal affinity (development superposable on the desired shape if the tangential speeds of the heating surface and of the coater are equal, of which development the dimensions in the direction perpendicular to the transfer generators are deduced from the corresponding dimensions of the desired shape in applying to them a coefficient equal to the ratio of the above said tangential speeds).

It is clear that to make the shape of the finished products vary, it then suffices to modify, by adjustment or by interchangeability, the shaper device which can be made easily accessible.

Known shaper devices are of two types. In the first case, the coaterdips conventionally into a paste tank and the film of paste that it draws and whose width is equal to the length of the generators of said coater, encounters at a predetermined point of its path, before arriving opposite the tansfer generator of the heating surface, either a wiper (movable scraper), or a deflector (generally cylindrical with hollow impressions) which produces on the coater the removal of the past at any point external to the contour suitable for the pellicle to transfer onto the heating surface. In a second case the coater does not dip into the container of paste but it receives the latter from a hopper which pours it along an upper generator of said coater through a slot whose length varies progressively with the passage of the coater which then draws towards the heating surface and from the origin of the pasting only the paste strictly necessary and in the appropriate shape.

The first type of shaper has the drawback of imparting an agitation to the paste (total pasting, wiping or tangential removal, or falling back into the tank) which is undesirable and does not permit the obtainng in positive manner of distinct contours for the finished product (tears and/or burrs on the edges at the moment of removal).

The second type of shaper seems better adapted to the operation to be carried out, but the aperture control of the slot is relatively complex and laborious since it necessitates a cam which drives the transmission through cables and pulleys and, in addition, the hopper system requires a rather fluid paste hence containing a fairly large amount of water which must be evaporated during baking which increases the expenditure of energy and results in blisters on the finished product although generally a smooth surface is sought.

GENERAL DESCRIPTION OF THE INVENTION

According to the invention there is provided a shaping device of a novel type in which the coater constituted by a smooth cylinder dips into the paste tank as in the first type but only extracts a succession of suitable "shapes" by means of an obturator system playing the role of a keyhole of a plug valve and arranged in the vicinity of the generator of the coater situated at the level of the surface of the paste and called extraction generator, which arrangement enables the advantages of the second type of shaper to be obtained without the drawbacks. For this, it is necessary for the obturator to eliminate the contact necessary for the drawing of the paste by the coater at certain points of this generator, for the said obturator to be arranged so that for each of its relative positions these points vary along the extraction generator, and so that it is actuated by a continuous or to and fro movement.

The obturator can be constituted, as will be stated below by a flap which is flat or concentric with the coater, actuated by a to and fro movement, applied to the coater at least along the extraction generator and including a cut-out or channel corresponding to half the shape of the pellicle to be transferred onto the baking surface.

The obturator can also be constituted by a continuously driven endless band, or by a rotary cylinder, substantially tangential to the coater along the extraction generator and having at least one hollow impression (or if necessary an opening if a band is concerned) corresponding to the shape of the pellicle to be transferred to the baking surface.

It is clear that the coater is only an intermediary ensuring the transportation of the paste film and that the contour of the finished product only depends on that of the opening or that of the impression of the obturator and of the ratio of the speed of the latter to that of the baking surface, the speed of the coater not being involved from this point of view. More accurately the contour of the opening or of the impression must be deduced from that desired for the finished product by an orthogonal affinity whose coefficient is equal to the ratio of the tangential speeds of the obturator and of the baking surface.

In the case where the obturator is a flat or curved flap, the cut-out corresponds to one-half of the desired shape and the pellicle drawn by the coater and consequently the finished product has necessarily a transverse line (parallel to the generators of the coater) of symmetry. With a band or a closure cylinder the shape can be absolutely any shaped.

It is unnecessary for the obturator and the coater to be in perfect mechanical contact; on the contrary it is preferable to arrange between them along the extraction generator a clearance of some hundredths of a millimeter. In fact, it is not indespensible for the coater cylinder to be completely dry on the outside of the selected contour; it can draw outside of this contour a very thin film of paste which has no chance of being transferred onto the baking surface. This arrangement obviously produces friction and has also the effect of conserving the cooling of the coater better and this without any consequence on the accuracy of the contour of the finished product since the two films (thick and thin) do not have the time to be mixed on the coater taking into the account the viscosity of the paste.

This slight clearance between the coater and the obturator enable, when the latter is constituted by an endless band or a cylinder, the adoption for these two members of the same direction of rotation (tangential speeds of opposite directions in the vicinity of the extraction generator) but it is then necessary to provide for the obturator a wiping scraper upstream of the extraction generator. It is also known, notably from French Pat. No. 75 05836 in the name of Applicant, that it is advantageous to respect between the transfer generators, a spacing preferably adjustable and to insert between these generators a deflector in the form of a rigid rod of small circular or polygonal cross-section. That is to say that the tangential speeds of the coater and of the baking surface in the vicinity of the transfer generator can be of the same direction or of opposite direction.

DESCRIPTION OF PREFERRED EMBODIMENTS

In a preferred embodiment of the invention, adopted following numerous trials, the baking surface, the coater and the obturator are all in the shape of cylinders of revolution (with a hollow impression for the obturator) all three rotating in the same direction.

In such an embodiment the cylinder or baking drum obviously has a considerable diameter in order that the baking time may be sufficient. It is hence possible to have from the beginning some slight machine defects (out of round) and aggravated in use by the more or less irregular deformations and expansions according to the type of heating adopted. Now as is taught by the forementioned French Pat. No. 75 95836, the spacing between the transfer generators once regulated as a function of the desired thickness of the desired product, must remain as constant as possible. This is why the invention also provides a machine characterised in that the coater and the obturator are mounted on the paste tank so as to form with the latter an assembly arranged on a slide borne by the frame of the machine, wherein this assembly is urged towards the baking surface by an elastic means and this elastic solicitation is limited by an adjustable stop with rotating rollers which bear against said surface in order that the adjusted spacing of the transfer generators may remain variable in spite of the expansions, deformations, the out of rounds, or other irregularities.

Finally, when the paste film has a turn-up tip (tangential speeds in opposite directions) at the place of the transfer onto the baking surface, it is important to avoid premature baking in this sharp corner which can result in bead formation and even of "cramming". Experience shows that it suffices for this to displace the deflector in the direction of rotation of the baking surface with respect to the plane defined by the axis of the baking cylinder and of the coating cylinder.

BRIEF DESCRIPTION OF THE DRAWINGS

The invention will be better understood by reading the description which follows and studying the accompanying drawing in which:

FIG. 1 shows diagrammatically the drawing of the paste film by the coating cylinder, FIGS. 2a and 2b are respectively a perspective view of an obturator in the form of a curved flap and a diagram showing its position with respect to the coater, FIGS. 3a and 3b are similar to FIGS. 2a and 2b in the case of an obturator in the form of a flat flap, FIG. 4 show an obturator constituted by an endless band, and FIG. 5 is the assembly diagram of a machine for making pancakes according to a preferred embodiment of the invention.

DETAILED DESCRIPTION OF PREFERRED EMBODIMENTS

In FIG. 1, a cylinder 10 with a smooth surface rotates in the direction of the arrow F1 around an axis 11 with its lower portion dipping into a fluid 12 having a certain viscosity and contained in a tank 13. The cylinder 10, in known manner, communicates its speed to the fluid 12 and its surface draws a pellicle 14 from the latter. At the same time there is formed in the immediate vicinity of the "entry" generator S of the cylinder in the fluid bath, a slight hollow and in the vicinity of the so-called extraction generator T an eddy forming a bead at the surface of the fluid. This hollow and this eddy are all the greater, for the same speed of rotation of the cylinder, as the viscosity of the fluid is greater.

Fluid 12 can be a paste intended for the manufacture by baking of a food or other product, for example of tasting pancakes. In this case the pellicle 14 is transferred in known manner onto a baking surface, for example, a baking cylinder as will be described below with respect to FIG. 5 and the cylinder 10 is then called a "coater". Mostly, the finished product must have a configuration, a given contour and the pellicle 14 must be in the form of a succession of distinct "islands" or connected together by a narrow and fragile tie.

To form these islands the invention provides a novel means which consists of arranging in the immediate vicinity of the extraction generator T, an obturator device which is constantly movable preventing the drawing of the film 14 at certain points of the generator T. It then suffices for these prevention points to vary according to a certain rule from one relative position of the obturator to the other to obtain a pre-determined contour for these islands.

In FIGS. 2a and 2b, the obturator 15 is in the form of a curved flap concentric with the coater 10 and mounted rockably around the axis 11 by means of a pair of rocker arms such as 16 of which the drive means, not shown, is such that the oscillation is connected with the speed of the passage of the baking surface (not shown). In the examples shown, the shape of the finished product is assumed to be circular or eliptic and the flap 15 has a cut-out into a channel 17 of semi-circular or semi-eliptical shape. It is clear that the islands of paste drawn by the coater 10 an consequently the finished products detached after baking from the baking surface and laid flat will have an axis parallel to the generators of the coater of lengths equal to the separation of the ends 18a, 18b of the arms of the cut-out and that in the perpendicular direction, the finished product has an axis of length corresponding to twice the depth of the cut-out modified by a coefficient of orthogonal affinity equal to the ratio of the speeds of passage of the baking surface and of the obturator (here average speed for the latter). Of course, the tanks containing the paste 12 must be of constant level.

In FIGS. 3a and 3b the process is the same, but here the obturator is constituted by a flat flap 19, having a cut-out 20, substantially tangential to the coater 10 along the extraction generator T and driven by a linear to and fro movement in guide means (not shown) under the action of suitable drive means.

It is to be noted that for these two embodiments the amplitude of the movement is such that the flap moves in front of the generator T from the bottom of the cut-out 17 and 20 up to substantially the ends 18a-18b, 21a-21b respectively of the arms of said cut-outs.

The cut-outs 17 and 20 could be replaced by openings (here circular or eliptic) corresponding no longer to half but to the whole of the desired contour, but this would lead to more complex wear and especially to very considerable bulk, although it still constitutes a technical equivalent remaining within the scope of the present invention.

However, if the application of a linear to and fro or oscillatory movement is well known and has no difficulties in theory, it necessitates relatively complex mechanical control by linkages and consequently a fragile system.

This is why it is preferably to select an obturator actuated by continuous movement.

FIG. 4 shows such an arrangement with an obturator constituted by an endless band 22 held taut between two rollers 23a and 23b of which one at least is a drive roller and is driven in rotation at a constant speed connected with the speed of passage of the baking surface. The band 22 is substantially tangential to the coater 10 along the extraction generator T and has one or several openings or one or several hollow impressions whose contours are deduced from that of the finished product by an orthogonal affinity whose coefficient is equal to the ratio of the speeds of the band 22 and of the baking surface.

As it has been stated above, the band 22 is not necessarily applied against the coater 10 along the generator T. A clearance of some hundredths of a millimeter and which can go up to a tenth of a millimeter can be provided, which enables the adoption for the direction of passage of the band either V1 (tangential speeds of the same direction in the vicinity of T), or V2 (tangential speeds of opposite directions), but in the latter case, there must be provided the wiping scraper 24 upstream of the upper roller 23b.

It is again an obturator with a continuous movement which is shown in FIG. 5 which shows a preferred embodiment of the invention and in which are shown, besides the coater and the obturator, the baking surface, the constant level device, and various arrangements which constitute features of the invention.

Here the baking surface is constituted by cylinder 25 of a large diameter with a smooth surface. The obturator is constituted by a rotating cylinder 26, substantially tangential (clearance of some hundredths of a millimeter) to the coater 10 along the extraction generator T, and bearing a hollow impression 27. Speed of rotation of the obturator 26 is connected with that of baking cylinder 25 and the developped contour of the impression 27 is deduced from the developped contour desired for the finished product by an orthogonal affinity with, for a coefficient, the ratio of the tangential speeds of the obturator and of the baking cylinder.

In the example shown, the baking cylinder 25, the coater 10 and the obturator 26 all rotate in the same direction. The deflector 29 constituted by a rigid rod of small cross-section (here circular) is arranged between the transfer generator and the coater and that of the baking cylinder so as to "project" onto the latter, islands of paste such as 30a, 30b in order to ensure the stability of the first point of contact of the paste on the baking surface. This arrangement is known (French Pat. No. 75 05836 already mentioned) but up to here the transfer generators were the closest generators situated respectively on the baking surface and on the coater, that is to say the deflector was placed substantially in the plane 31 defined by the axis of rotation of these two members. It has been found that a better result was obtained by displacing the deflector by some millimeters with respect to this plan in the direction of rotation of the baking surface. The angle formed by the paste film constituted by the island 30a at the transfer point is thus less sharp and the risk of premature baking at this point is avoided.

As in all the devices previously described, it is necessary to ensure the stability of the extraction generator T, that is to say to ensure a very substantially constant level in the bath of paste 12. In FIG. 5 is shown a conventional level system comprising a flexible supply pipe 32 connected to a paste tank (not shown) and a float 33.

The coater 10 and the obturator 26 rotating in the same direction, the latter is cleaned upstream of its highest generator by a wiping scraper 34.

The paste tank is constituted by bent sheet metal 35 arranged in a frame 36. All dead corners where stale paste could accumulate are thus eliminated.

The axes of the coater 10 and of the obturator 26 pivot on the sideplates of the frame 36, the drive pinion (not shown) of each of them being of course located outside the frame. The deflector 29 tangential to the coater 10 is also fast to the frame 36.

Thus the tank with its constant level system forms with the whole of the paste transfer device (obturator 26 plus coater 10 plus deflector 29) an assembly arranged facing the baking cylinder 25. It is known that to adjust the thickness and density of the finished product it is necessary to be able to adjust the speed of the coater and/or of the baking surface and the separation of the transfer generators. In the machine of FIG. 5 the adjustment of the separation of the transfer generators comes back to separating more or less the pasting assembly which has just been defined, that is to say the tank, from the baking surface. For this, the frame 36 is arranged on a plate 37 forming a slide, fast to the carriage of the machine bearing the supports of the baking cylinder 25, whilst certain clearance is arranged in the engagement of the gear wheels for driving the coater and the obturator with their respective drive pinion, these pinions are being borne by the chassis of the machine. Thus the tank can be brought closer to or separated from the baking surface within the limits of the abovementioned clearance. This arrangement is completed by a pusher 38 bearing elastically against a part 39 fast to frame 36 of the tank so as to urge the pasting assembly towards the baking surface and by a stop 40 adjustable by means of a milled knob 41 holding this assembly at the desired distance from said baking surface by means of a bearing member 42 with rollers which roll over the latter or, as shown in FIG. 5, in peripheral grooves of the baking cylinder. It is thus possible to regulate and to maintain the spacing of the transfer generators with great accuracy. In addition, due to the action of the elastic pusher and to the reaction of the roller bearing member this spacing once adjusted remains invariable in time whatever the imperfections of the baking cylinder due to defects of machining, of centering (false round), or deformations which is undergoes through expansion.

Of course, the pusher 38 can be withdrawn for example by rocking around an axis 43, in order to retract the pasting assembly from the slide 38 to procede with cleaning of the tank, with maintenance or with replacement of various members and with changing of the obturator when it is desired to modify the shape of the desired product.

In known manner, after having remained on the baking cylinder for a given interval less than that of a complete revolution, each island of paste 30a, 30b is detached from the heating surface by a scraper to fall onto an endless removal belt or onto another baking surface (baking cylinder or heating band). It is clear that according to the placing of the scraper on the periphery of the baking cylinder (to the right or the left of the vertical plane passing through the axis of said cylinder) it is the external surface (the least baked) of the island or its surface in contact with the baking means which becomes applied by gravity onto the second baking surface, which enagles the provision in the same machine for the production of tasting pancakes baked on one or two surfaces and of lined pancakes (baked on one surface but heated again with an garniture) for refreshment.

I claim:

1. Machine for manufacturing pancakes or other products obtained by baking or heating a paste spread thinly in a given configuration. comprising a smooth and continuous baking surface, a paste tank, a spreader constituted by a cylinder with a smooth surface dipping into said paste tank at a substantially constant level, two close generators situated respectively on the baking surface and on the spreader and called transfer generators, said spreader being arranged to transport and to transfer the paste onto the baking surface at the level of said close generators, said baking surface and said spreader being actuated in relative movement, a flap obturator arranged in the immediate vicinity of the generator of the spreader situated at the level of the surface of the paste on the emergence side, and called extraction generator, eliminating the contact necessary for the drawing of the paste by the spreader at certain points of the generator, said obturator being arranged so that for each of its relative positions, these points vary along the extraction generator and being driven in to and fro movement, and wherein the obturator is constituted by a flap concentric with the spreader, laying on it with gentle rubbing, having a cut-out or channel corresponding to half of the shape of the pellicle to be transferred to the baking surface and mounted to rock around the axis of rotation of the spreader in a movement connected to the speed of the baking surface and whose amplitude corresponds at least to the depth of the cut-out.

2. Machine according to claim 1, wherein the baking surface is a cylinder of revolution and the two transfer generators are spaced adjustably, wherein the spreader and the obturator are mounted on the paste tank so as to from with said paste tank an assembly, a slide borne by the frame of the machine, said assembly being mounted on said slide, elastic means for urging said assembly towards said baking surface, an adjustable stop with rotating rollers which bear against said baking surface for limiting the movement of said assembly by said elastic means so that the adjusted spacing of the transfer generators remains invariable in spite of expansions, deformations, out of roundness or other irregularities.

3. Machine according to claim 1 wherein the baking surface is a cylinder of revolution rotating in the same direction as the spreader cylinder, the two transfer generators being spaced and a deflector constituted by a rigid part of small section being arranged between the baking surface and the spreader at a very slight distance from the latter and parallel to the transfer generators, wherein the deflector is displaced in the direction contrary to the rotation of the spreader cylinder with respect to the plane defined by the axis of the baking cylinder and of the spreader cylinder in order to reduce the effect of pre-baking at the top of the angle formed by the paste film.

4. Machine for manufacturing pancakes or other products obtained by baking or heating a paste spread thinly in a given configuration, comprising a smooth and continuous baking surface, a paste tank, a spreader constituted by a cylinder with a smooth surface dipping into said paste tank at a substantially constant level, two close generators situated respectively on the baking surface and on the spreader and called transfer generators, said spreader being arranged to transport and to transfer the paste onto the baking surface at the level of said close enerators, said baking surface and said spreader being actuated in relative movement, a flap obturator arranged in the immediate vicinity of the generator of the spreader situated at the level of the surface of the paste on the emergence side, and called extraction generator, eliminating the contact necessary for the drawing of the paste by the spreader at certain points of the generator, said obturator being arranged so that for each of its relative positions, these points vary along the extraction generator and being driven in to and fro movement, and wherein the obturator is constituted by a flat flap substantially tangential to the spreader along the extraction generator, having a cut-out or channel corresponding to half the shape of the pellicle to be transferred to the baking surface and driven in a to and fro translation movement connected with the speed of the baking surface and whose amplitude corresponds at least to the depth of the cut-out.

5. Machine according to claim 4, wherein the baking surface is a cylinder of revolution and the two transfer generators are spaced adjustably, wherein the spreader and the obturator are mounted on the paste tank so as to form with the latter an assembly arranged on a slide borne by the frame of the machine, this assembly being urged towards the baking surface by elastic means and this elastic urging being limited by an adjustable stop with rotating rollers which bear against said surface so that adjusted spacing of the transfer generators remains invariable in spite of expansions, deformations, out of roundness or other irregularities.

6. Machine according to claim 4, wherein the baking surface is a cylinder of revolution rotating in the same direction as the spreader cylinder, the two transfer generators being spaced and a deflector constituted by a rigid part of small section being arranged between the baking surface and the spreader at a very slight distance from the latter and parallel to the transfer generators, wherein the deflector is displaced in the direction contrary to the rotation of the spreader cylinder with respect to the plane defined by the axis of the baking cylinder and of the spreader cylinder in order to reduce the effect of prebaking at the top of the angle formed by the paste film.

7. Machine for manufacturing pancakes or other products obtained by baking or heating a paste spread thinly in a given configuration, comprising a smooth and continuous baking surface, a paste tank, a spreader constituted by a cylinder with a smooth surface dipping into said paste tank at a substantially constant level, two close generators situated respectively on the baking surface and on the spreader and called transfer generators, said spreader being arranged to transport and to transfer the paste onto the baking surface at the level of said close generators, said baking surface and said spreader being actuated in relative movement, a flap obturator arranged in the immediate vicinity of the generator of the spreader situated at the level of the surface of the paste on the emergence side, and called extraction generator, eliminating the contact necessary for the drawing of the paste by the spreader at certain points of the generator, said obturator being arranged so that for each of its relative positions, these points vary along the extraction generator and being driven in to and fro movement, and wherein the baking surface is a cylinder of revolution and the two transfer generators are spaced adjustably, wherein the spreader and the obturator are mounted on the paste tank so as to form with said paste tank an assembly, a slide bourne by the frame of the machine, said assembly being mounted on said slide, elastic means for urging said assembly towards said baking surface, an adjustable stop with rotating rollers which bear against said baking surface for limiting the movement of said assembly by said elastic means so that the adjusted spacing of the transfer generators remains invariable in spite of expansions, deformations, out of roundness or other irregularities.

* * * * *